Figure 1:
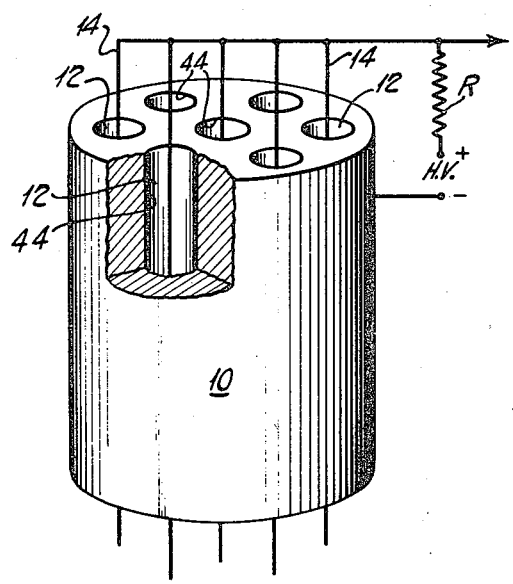

Feb. 22, 1949.　　　　K. C. CRUMRINE　　　　2,462,471
RADIATION DETECTOR
Filed Nov. 24, 1943

INVENTOR
K. C. CRUMRINE.
BY
ATTORNEY

Patented Feb. 22, 1949

2,462,471

UNITED STATES PATENT OFFICE 2,462,471

RADIATION DETECTOR

Kenneth Carl Crumrine, Bellaire, Tex., assignor to The Texas Company, New York, N. Y., a corporation of Delaware Application November 24, 1943, Serial No. 511,516

9 Claims. (Cl. 250—27.5)

This invention relates to bore hole or well logging of the type where a source of penetrative neutron radiation and a detector of scattered neutron radiation are passed through a bore hole, fast neutrons from the source penetrating the formations traversed by the hole and after being scattered and slowed down in the formations returning to actuate the detector, the amount of returned radiation providing an indication of the nature of the formations surrounding the hole. More particularly the invention relates to a neutron detector of the proportional counter type which can be made more responsive to slow neutrons than to other radiation such as gamma rays.

In addition to its use in well logging a detector embodying the principles of the invention may also be used where other measurements of neutron radiation are desired, such as in connection with a measurement of a thickness of a plate or wall, and the determination of liquid level or the density of a fluid in a pipe or other container.

In one method of radiological bore hole logging a source of neutron radiation, such as a mixture of radium and beryllium, and a detector of slow neutrons are disposed within a suitable housing or capsule which is lowered and raised through the hole by means of a suitable cable containing electrical conductors for conveying the output or impulses of the detector upwardly to the surface and for conveying downwardly to the instrument the electrical power necessary to actuate the detector. The fast neutrons from the source pass outwardly into the formations surrounding the hole wherein the neutrons are scattered and slowed down, some returning to the hole to actuate the detector. By noting the response of the detector as the instrument passes through the various formations, the location and nature of these formations can be determined.

It has been very difficult to provide a detector which will distinguish between neutron radiation and gamma radiation. A certain amount of gamma radiation is usually emitted from the neutron source, and, since ionization chambers and detectors of the Geiger-Muller type are responsive to this gamma radiation, it is very difficult to determine which part of the response of the detector is due only to the scattered, returned neutrons.

The actions of an ionization chamber, a proportional counter, and a Geiger-Muller counter differ as follows: In all three cases ions are set free in the gas through the action of the rays. This ionizing may be a direct ionization of the gas, or it may be a secondary ionization of the gas due to the action of charged particles which are emitted from the walls of the container. In all three devices the ions are collected at the electrodes, but in the Geiger-Muller counter and in the proportional counter a multiplication of the ions occurs within the detector. Due to this multiplication, the charge which is collected is much larger in the case of the Geiger-Muller counter and of the proportional counter than in the ionization chamber. The charge collected can or cannot be dependent on the number of primary ions which are formed in the gas by one individual ray. In a Geiger-Muller counter the size of the charge collected is independent of the number of ions formed by one ray; in a proportional counter, however, the charge collected is proportional to the number of ions formed. The result is, therefore, that the size of the charge pulses in a proportional counter varies with the effectiveness of the ionizing rays. The number of these pulses is a measure of the number of such rays, i. e., of the intensity of the rays. It is therefore possible with a proportional counter to distinguish between rays which produce different amounts of primary ionization.

Neutrons do not ionize at all. In order to detect neutrons one has to use an intermediate reaction by which the neutrons release ionizing particles which in turn act on the gas of the proportional counter. Such reactions are known to occur with, for example, lithium and boron. A proportional counter can either be filled with a gas, such as boron trifluoride, which contains a compound of one of these elements or the wall of the counter can be lined with the elements or their compounds, or a combination of both procedures can be used. In these reactions alpha particles are emitted under the action of the neutrons, whereas gamma rays release electrons. The specific ionization by alpha rays is much greater than by electrons; therefore, the charge pulses in the proportional counter are larger if they are due to neutrons than if due to gamma rays. By selecting the pulse size with suitable electrical circuits one can therefore distinguish between the neutrons and the gamma rays.

Some gamma radiation from the source or natural gamma radiation from the formations usually reaches the detector and causes some confusion in analyzing the response. In accordance with this invention, a neutron detector has been provided and the cathode of the device is formed of a material which is more transparent to neutrons than to gamma radiation; in other words, neutrons reaching the detector pass freely through the cathode to strike either the neutron-reactive coating or the gas containing the boron or lithium compound, whereas gamma rays reaching the detector are substantially absorbed by the material of the cathode.

A preferred form of the invention comprises a block of lead in which one or more holes are provided, an anode wire passing along the longitudinal axis of each hole. The lead block is disposed within a suitable housing and in one form the surfaces of the holes in the lead are coated with a neutron-reactive substance such as lithium or boron or their compounds, for example, boron carbide, while in another form a neutron-reactive gas such as boron trifluoride is used to fill the space within the housing.

Figure 2:
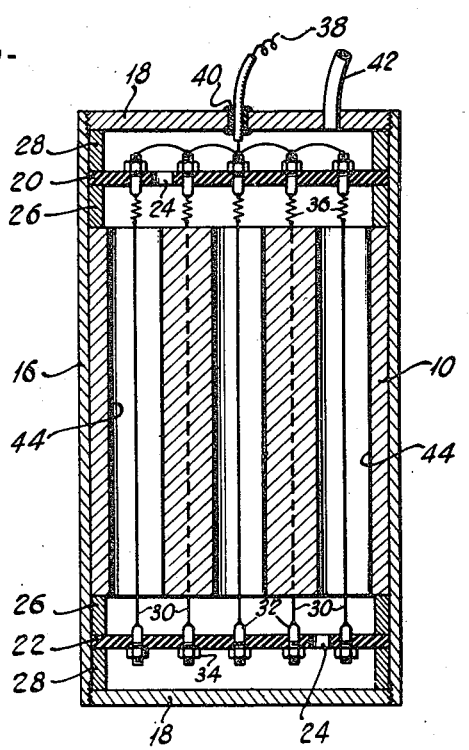

For a better understanding of the invention reference may be had to the accompanying drawing in which:

Figure 1 is a perspective view, partly in section, showing the cathode and the anode of a detector embodying the principles of this invention; and Figure 2 is an elevation, partly in section, showing a complete detector.

As stated hereinbefore, the material used for the construction of the detector, or rather the material of which the cathode is composed, should be more transparent to neutrons than to gamma radiation. The mean free paths of slow neutrons in several substances are listed below:

| Substance | Path in Cm. | Substance | Path in Cm. |
|---|---|---|---|
| Al | 11 | Cu | 1.6 |
| Sn | 8.5 | Fe | 1.0 |
| Mg | 6.6 | W | 0.7 |
| Bi | 4.3 | Ni | 0.7 |
| Pb | 3.5 | Pt | 0.6 |
| Brass | 2.1 | Ag | 0.3 |

From these data it might appear that aluminum, tin or magnesium would be better for the construction of the detector cathode than lead. Aluminum and magnesium, however, have little absorption for gamma radiation. For this reason, it is preferred that the detector cathodes be formed of lead, bismuth or tin, or their alloys, although it is contemplated that some of the other materials listed in the above tabulation could also be used effectively.

In Figure 1 of the drawing, a lead block 10 is shown as provided with a plurality of holes 12 extending substantially parallel through the block. A fine wire 14, preferably of tungsten and about three mils in diameter, is disposed along the longitudinal axis of each of the holes 12 and these wires are connected together electrically to form the anode of the detector. As shown in Figure 1, the anode is maintained at a positive potential with respect to the cathode and a fairly high resistance R is connected in series with the electrodes and a source of high potential. It has been found that for a proportional counter constructed as described a potential difference of the order of 1000 volts is satisfactory.

As is shown in Figure 2, the cathode block 10 is mounted in a housing 16 which may be formed of a brass cylinder and a pair of end or cover discs or plates 18, also of brass. It is preferred that in counters where boron trifluoride is to be used, any surfaces of brass which are exposed to the gas should be coated with a material which is substantially inert to the gas, such, for instance as lead or copper. Disposed in the end portions of the housing are a pair of discs 20 and 22 of an electrical insulating material, each of the discs being provided with an aperture 24. A pair of spacer rings 26 separate the discs 20 and 22 from the cathode block 10 and another pair of similar rings 28 space the discs 20 and 22 from end plates 18. In some cases it may be preferable to minimize the area of contact between the peripheries of the discs 20 and 22 and the container 16 and spacer rings 26 and 28 so as to reduce electrical leakage. To this end the discs can be made smaller in diameter than the interior of rings 26 and 28 and attached to the block 10 as by means of quartz insulators. An anode wire 30 extends through each of the holes 12 of the cathode block and is affixed at its lower end to the disc 22 in any suitable manner, as by means of a small bolt 32 threaded into the disc 22 and locked in position by means of a lock nut 34. The upper ends of the wires 30 are adjustably mounted in the disc 20 in a similar manner but between the upper end of each wire and its adjusting screw or bolt 32 is a small tension spring 36 for maintaining the wire under tension. The wires 30 are connected together electrically and to an anode lead wire 38 which passes outwardly through the upper plate 18, this lead being insulated from the plate by means of an insulating bushing 40. The upper plate 18 is provided with a suitable filler opening into which a short length of tubing 42 is soldered. After the housing has been evacuated and then filled with the desired gas it is sealed by crimping off the tubing 42. The openings 24 in the insulating discs 20 permit the gas to fill the spaces in the entire device, including the holes 12 in the cathode block.

In the preferred form of the invention, the holes 12 are lined with a coating 44 of a suitable neutron-reactive material, preferably a compound or boron or lithium, such, for instance, as boron carbide. Although various gases such as air, argon, nitrogen, a mixture of argon and petroleum ether, etc., can be used to fill a counter of this type, a hydrocarbon gas such as methane has been found very satisfactory. In another embodiment a neutron-reactive gas such as boron trifluoride will be used as the filling for the counter.

The radiation which reaches the detector contains both gamma rays and neutrons. The lead of the cathode absorbs the gamma rays relatively stronger than the neutrons. The radiation after having passed through the lead of the cathode will therefore be relatively richer in neutrons than in gamma rays.

Although the detector has been described as including a cathode formed of a solid block of lead, it is to be understood that the invention also contemplates the use of other cathodes such as one formed of a plurality of slightly separated, parallel plates or discs of lead or another metal transparent to neutrons but having a strong absorption for gamma radiation. A gamma radiation detector constructed in this manner is disclosed in the copending application of D. G. C. Hare, Serial No. 412,617, filed September 27, 1941, now U. S. Letters Patent No. 2,397,071, granted March 19, 1946.

Obviously many modifications and variations of the invention, as hereinbefore set forth, may be made without departing from the spirit and scope thereof, but only such limitations should be imposed as are indicated in the appended claims.

I claim:
1. A device for detecting neutron radiation comprising a block of lead forming a cathode and provided with a plurality of parallel holes, a wire disposed along the axis of each of said holes, said wires forming an anode, and a coating of boron carbide on the surfaces of said holes.

2. A device for detecting neutron radiation comprising a block of a substance having low absorption for neutrons and high absorption for gamma radiation, said block being provided with at least one hole extending longitudinally therethrough, a wire disposed along the axis of said hole, said wire forming the anode and said block forming the cathode of the device, and a coating on the surface of the hole of said block, said coating being of a substance capable of emitting alpha rays when bombarded by neutrons.

3. A device for detecting neutron radiation comprising a housing, a cathode member in said housing, said member being formed of a block of a substance having low absorption for neutrons and high absorption for gamma rays and provided with a plurality of holes, a wire disposed along the axis of each of said holes, said wires being connected together electrically to form an anode, a coating on the surfaces of said holes, said coating being formed of a substance capable of emitting alpha rays when bombarded by neutrons, and a gaseous hydrocarbon in said housing.

4. A device for detecting neutron radiation comprising a housing, a block of lead in said housing provided with a plurality of holes, said block forming the cathode of the device, an anode wire disposed along the axis of each of said holes, a coating of a boron compound on the surfaces of said holes, and a gaseous filling in said housing, said filling comprising essentially methane.

5. A device for detecting neutron radiation comprising a closed housing, a block of lead in said housing provided with a plurality of holes, said block forming the cathode of the device, a wire disposed along the axis of each of said holes, said wires being connected together electrically to form an anode, a coating on the surfaces of said holes, said coating being formed of a substance capable of emitting alpha rays when bombarded by neutrons, and a gaseous hydrocarbon filling in said housing, said filling being maintained at a subatmospheric pressure.

6. A device for detecting neutron radiation comprising a closed housing, a block of a substance having low absorption for neutrons and high absorption for gamma radiation in said housing, said block being provided with at least one hole extending longitudinally therethrough, a wire disposed along the axis of said hole, said wire forming the anode and said block forming the cathode of the device, and a gaseous filling in said housing, said filling comprising essentially a gas capable of emitting alpha rays when bombarded by neutrons.

7. A device for detecting neutron radiation comprising a closed housing, a block of lead in said housing, said block being provided with a plurality of holes extending longitudinally therethrough, a wire disposed along the axis of each of said holes, said wires forming the anode and said block forming the cathode of the device, and a gaseous filling in said housing, said filling comprising essentially boron trifluoride.

8. A device for detecting neutron radiation comprising a housing, a cathode member in said housing formed of a substance more transparent to neutrons than to gamma radiation, said member being provided with a plurality of holes extending longitudinally therethrough, a wire disposed along the axis of each of said holes, said wires forming the anode of the device, and a gaseous filling in said housing, said filling comprising essentially a gas capable of emitting alpha rays when bombarded by neutrons.

9. A device for detecting neutron radiation comprising a closed housing, a block of lead in said housing, said block being provided with a plurality of holes extending longitudinally therethrough, a wire disposed along the axis of each of said holes, said wires forming the anode and said block forming the cathode of the device, and a substance interposed between the body of said cathode block and the anode wires, which substance is capable of emitting alpha rays when bombarded by neutrons.

KENNETH CARL CRUMRINE.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,288,718 | Kallmann | July 7, 1942 |
| 2,303,709 | Siegert | Dec. 1, 1943 |
| 2,383,477 | Friedman | Aug. 28, 1945 |
| 2,397,071 | Hare | Mar. 19, 1946 |

FOREIGN PATENTS

| Number | Country | Date |
| --- | --- | --- |
| 690,411 | Germany | Apr. 24, 1940 |